United States Patent [19]
Ootaki et al.

[11] Patent Number: 5,901,131
[45] Date of Patent: May 4, 1999

[54] OPTICAL PICKUP USED WITH BOTH DVD AND CD

[75] Inventors: Sakashi Ootaki; Masayuki Iwasaki, both of Tsurugashima, Japan

[73] Assignee: Pioneer Electronic Corporation, Tokyo, Japan

[21] Appl. No.: 08/993,709

[22] Filed: Dec. 18, 1997

Related U.S. Application Data

[63] Continuation of application No. 08/686,920, Aug. 1, 1996, Pat. No. 5,734,637.

[30] Foreign Application Priority Data

| Aug. 4, 1995 | [JP] | Japan | ..................................... | 7-199500 |
| Mar. 12, 1996 | [JP] | Japan | ..................................... | 8-54669 |

[51] Int. Cl.$^6$ .................................................. G11B 7/00
[52] U.S. Cl. .............................. 369/112; 369/118; 369/58
[58] Field of Search ............................. 369/13, 109, 110, 369/112, 54, 58, 118, 116, 117, 124, 44.23, 44.24

[56] References Cited

U.S. PATENT DOCUMENTS

| 5,281,797 | 1/1994 | Tatsuno et al. | ..................... 369/118 X |
| 5,416,757 | 5/1995 | Luecke et al. | ...................... 369/112 X |
| 5,526,336 | 6/1996 | Park et al. | ........................... 369/112 X |
| 5,734,637 | 3/1998 | Ootaki et al. | ........................... 369/112 |

*Primary Examiner*—Paul W. Huber
*Attorney, Agent, or Firm*—Sughrue, Mion, Zinn Macpeak & Seas, PLLC

[57] ABSTRACT

An optical pickup of a compatible type which can be switched for a DVD and a CD by a completely electrical control without the need of a mechanical moving device or the like and is suitable for the reduction in size and also has an excellent efficiency in the use of light. A liquid crystal panel of a transmission type which gives a phase difference of a ¼ wavelength or a wavelength that is an odd number multiple of ¼ wavelength to a transmission light and has a transparent electrode having an aperture pattern of a predetermined shape is used and the liquid crystal panel is arranged so that its plane of polarization crosses a plane of polarization of a polarization beam splitter at a predetermined angle. An applied voltage to the transparent electrode is controlled so that the whole surface of the liquid crystal panel functions as a ¼ wavelength plate during a reproduction operation or a recording operation of the DVD and only the aperture pattern portion functions as a ¼ wavelength plate during the reproduction operation of the CD.

5 Claims, 16 Drawing Sheets

BIREFRINGENCE    $\Delta n = n_1 - n_2$

OPTICAL PICKUP USED WITH BOTH DVD AND CD

This is a continuation of application Ser. No. 08/686,920 filed Aug. 1, 1996 now U.S. Pat. No. 5,704,637.

BACKGROUND OF THE INVENTION

1. Field of the Invention

The present invention relates to an optical pickup for recording or reading out record information to/from an optical disc, and more particularly, to an optical pickup of a compatible type which can be used for both of a DVD (Digital Video Disc) and a CD (Compact Disc).

2. Description of Background Information

The DVD is an optical disc which is capable of recording a large amount of digital information, and its recording scheme allows the recording of digital information such as motion picture, computer information, or the like on a disc having the same diameter of 12 cm as the CD, at a recording density of six to eight times as high as that of the CD. In order to achieve such a high density recording, various devices have been developed for the DVD. For example, one kind of the DVD called SD (Super Density Disc) will now be considered. In order to increase a recording capacity, the wavelength of a laser light source to be used is 650 nm (nanometers) or 635 nm, which is much shorter than 780 nm of the CD, and a numerical aperture NA of an objective lens is set to 0.6, which is larger than the corresponding value 0.45 of the objective lens for the CD. Furthermore, the MPEG2 is used as the data compression algorithm, thereby achieving a high density recording of about 5 G bytes (about eight times as high as that of the CD) on one side of the disc. As mentioned above, the recording is performed on the DVD at a density much higher than the CD. Therefore, it is necessary to set a spot diameter of a laser beam for reading pit information to a value that is fairly smaller than that of the CD. The spot diameter of the laser beam is proportional to the wavelength $\lambda$ of the laser being used and is inversely proportional to the numerical aperture NA of the objective lens. In the SD, such a structure is realized by using a laser light source of a short wavelength and an objective lens having a large numerical aperture NA.

In view of the point the DVD and the CD use the same recording format, it is desired that the CD can be also reproduced by a DVD player. When the wavelength $\lambda$ of the laser is shortened and the numerical aperture NA of the objective lens is raised for the DVD, however, the margin for the deviation angle of the disc surface from the direction perpendicular to an optical axis of the optical pickups that is, the so-called tilt angle, becomes small. Since the thickness of the disc of the Cp is larger than that of the DVD (for example, the disc thickness of one side of the SD is equal to 0.6 mm, that of the CD is equal to 1.2 mm), the spot diameter of the laser beam becomes enlarged in the CD due to a difference in aberration or the like. In such a situation, therefore, there occurs a problem that information of the CD cannot be read by using the optical pickup for the DVD.

In order to solve such a problem, there conventionally have been proposed such a method that two objective lenses for DVD and CD are prepared and the lenses are switched in accordance with the type of disc, a method that a correcting lens is inserted into a collimator portion, thereby correcting the aberration due to the disc, a method that a two-focal point lens using a hologram is used as an objective lens, and the like.

In the case of the method using two objective lenses or the method using the correcting lens, however, there are drawbacks that a complicated mechanism which occupies a large space is necessary, so that it is not suitable for a reduction in size. In the case of the method of using the hologram, drawbacks are such that since a diffraction and an interference are used and there are always a plurality of spots, the efficiency in use of a light cannot be raised. Furthermore, because of its multi-beam scheme, an influence by interference can develop easily.

OBJECTS AND SUMMARY OF THE INVENTION

The present invention has been made to solve the above-mentioned problems and it is an object of the invention to provide an optical pickup of a compatible type which can be switched for the DVD and CD only by an electrical control ultimately without the need of a mechanical moving device and which is suited for reduction in size and is also excellent in efficiency of the use of light.

In order to achieve these objectives, the following various features are devised in the present invention.

According to the first aspect of the invention, there is provided an optical pickup comprising at least a laser light source, a beam splitter, and an objective lens, wherein a diaphragm means which can electrically vary an aperture pattern is arranged between the objective lens and the beam splitter and the aperture pattern is switched in accordance with the type of the optical disc to be used.

According to the second aspect of the invention, in the above described optical pickup, the beam splitter is a polarization beam splitter. A liquid crystal panel of a transmission type which gives a phase difference of a ¼ wavelength or a wavelength that is an odd number multiple of the ¼ wavelength to a transmission light and which has a transparent electrode having an aperture pattern of a predetermined shape, is used as a diaphragm means. The liquid crystal panel is arranged so that its plane of polarization crosses a plane of polarization of the polarization beam splitter at a predetermined angle, and a voltage applied to the transparent electrode is controlled so that the whole surface of the liquid crystal panel functions as a ¼ wavelength plate when reproduction or recording is performed on an optical disc for the high-density recording and only the aperture pattern portion functions as a ¼ wavelength plate when the reproduction of the compact disc is performed.

According to the third aspect of the invention, in the optical pickup according to the second aspect of the invention, a plurality of aperture patterns are formed along the radial direction of the disc. The applied voltage is controlled so that the aperture pattern portion in which an optical axis of the objective lens coincides with the center of the aperture functions as a ¼ wavelength plate.

According to a further aspect of the invention, in the above described two kinds of optical pickups, a voltage which is applied to the liquid crystal panel is variably controlled to an optimum value on the basis of applied voltage—light reception amount characteristic of the liquid crystal panel.

According to a still further aspect of the invention, in any one of the above described optical pickups, when the optical disc for high density recording is reproduced, an amount of the transmission light in the center portion of the liquid crystal panel is attenuated by a predetermined amount than that of the peripheral portion.

According to a further aspect of the invention, in the optical pickup according to the first aspect of the invention, an electrochromic panel of a transmission type having a transparent electrode having an aperture pattern in a predetermined shape is used as a diaphragm means and the applied voltage to the transparent electrode is controlled so that the whole surface of the electrochromic panel is transparent in the reproducing and recording operations of the optical disc for high density recording, and only the aperture pattern portion is transparent during the reproducing operation of the compact disc.

According to a still further aspect of the invention, in the optical pickup, a plurality of aperture patterns are formed along the radial direction of the disc and the applied voltage is controlled so that the aperture pattern portion in which the optical axis of the objective lens and the aperture center coincide becomes transparent.

According to a further aspect of the invention, in the above two kinds of optical pickups, the transmission light amount in the center portion of the electrochromic panel is attenuated by a predetermined amount than that of the peripheral portion when the reproduction of the optical disc for high density recording is performed.

According to a still further aspect of the invention, in any one of all of the optical pickups, the shape of the aperture pattern is a circle.

Since the optical pickup of the invention has the features as mentioned above, the numerical aperture NA of the lens can be electrically switched by the diaphragm means using such an element as liquid crystal panel, electrochromic panel, or the like. Both of the DVD and the CD can be, therefore, reproduced by using the same optical pickup.

A plurality of aperture patterns are formed along the radial direction of the disc and the applied voltage is controlled so that the aperture pattern in which the optical axis of the objective lens and its aperture center coincide, becomes the ¼ wavelength plate or transparent. A deterioration in performance of the optical pickup in association with the positional deviation of the aperture pattern center from the optical axis of the objective lens due to an eccentricity of the optical disc can be prevented.

Since the voltage which is applied to the liquid crystal panel is variably controlled to the optimum value on the basis of the applied voltage—reception light amount characteristic of the liquid crystal panel, even if there is a change in temperature of the surroundings or a difference in the cell thickness of the liquid crystal, the liquid crystal panel can be made to accurately function as a ¼ wavelength plate.

Since the transmission light amount in the center portion of the liquid crystal panel or the electrochromic panel is attenuated by a predetermined amount than that of the peripheral portion during a reproducing operation of the optical disc for high density recording, a rim intensity of the light entering the objective lens is equivalently enhanced and the spot diameter on the disc can be further reduced. Consequently, recorded data of a read-only DVD (what is called a DVD-ROM) or the like on which the data is recorded at a high density can be certainly read out.

DETAILED DESCRIPTION OF THE PREFERRED EMBODIMENTS

Embodiments of the invention will now be described with reference to the accompanying drawings.

Figure 1:
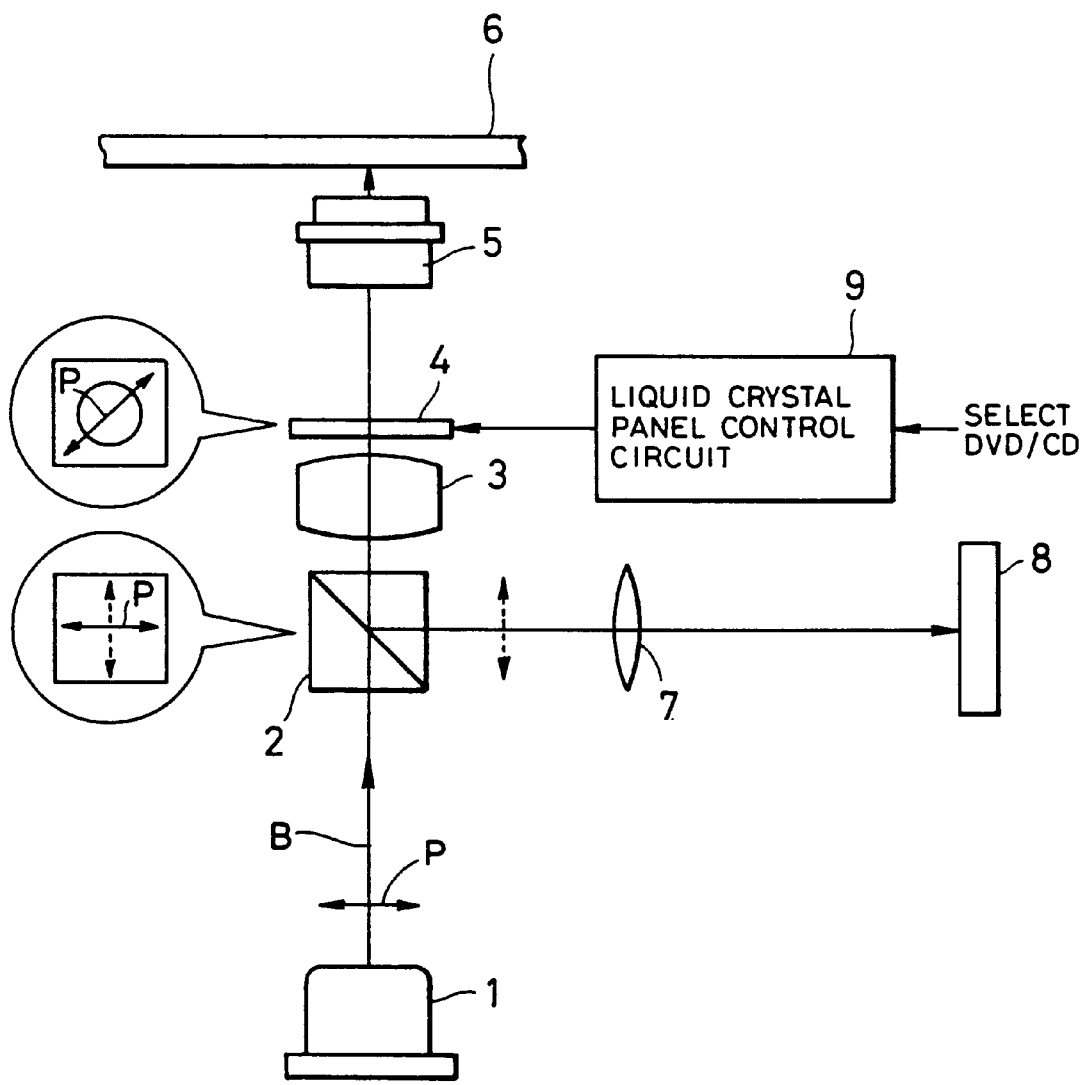
FIG. 1 is a diagram showing the structure of the first embodiment of an optical pickup according to the invention.

FIG. 1 shows the first embodiment of a pickup according to the invention. The first embodiment shows an example in which a liquid crystal panel is used as an electrical diaphragm means.

As shown in FIG. 1, the pickup includes a laser light source 1, a polarization beam splitter 2, a collimator lens 3, a liquid crystal panel 4, an objective lens 5, an optical disc 6, a condenser lens 7, a photodetector 8, and a liquid crystal panel control circuit 9. A laser beam B emitted from the laser light source 1 passes through the polarization beam splitter 2 and is converted to a planer wave by the collimator lens 3. After that, the planer wave passes through the liquid crystal panel 4 and is condensed by the objective lens 5 and is focused on an information recording surface of the optical disc 6.

The laser beam reflected by the information recording surface of the optical disc passes the objective lens 5, liquid crystal panel 4, and collimator lens 3 and reaches the polarization beam splitter 2. As will be readily understood from the description made hereinafter, the laser beam is reflected in the horizontal direction by a plane of polarization of the polarization beam splitter 2 and an image is formed on the photodetector 8 via the condenser lens 7.

Figure 2A:
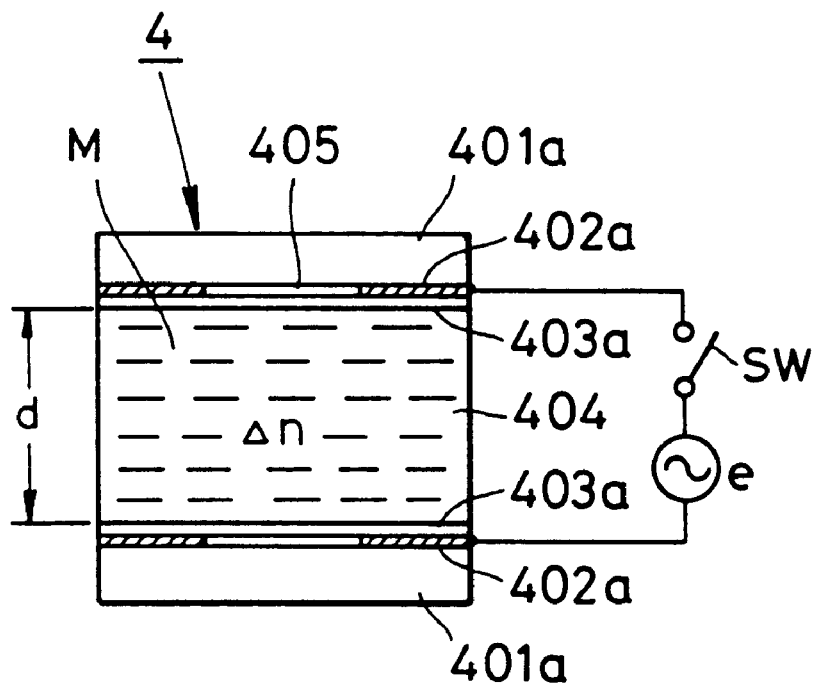
FIGS. 2A and 2B are diagrams showing a structure of a liquid crystal panel.
Figure 2B:
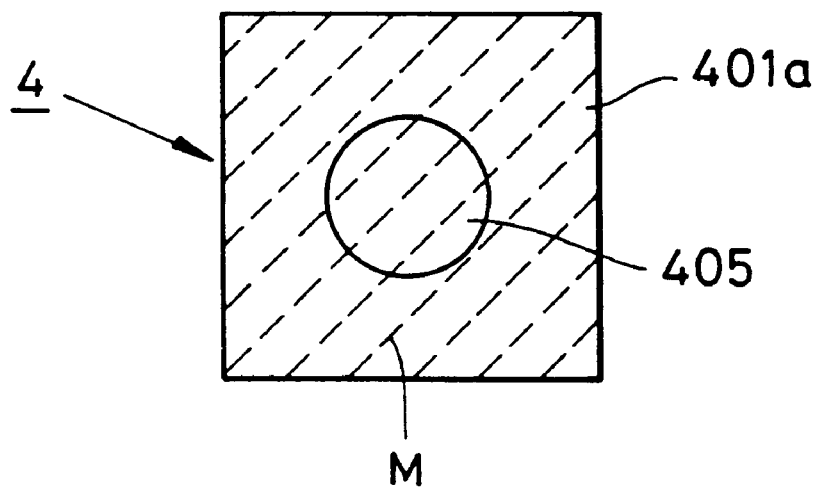

FIGS. 2A and 2B show a structural example of the liquid crystal panel 4 wherein FIG. 2A is a schematic sectional view of the liquid crystal panel and FIG. 2B is a schematic plan view thereof.

In the diagrams, reference numeral 401a denotes a transparent glass substrate and a transparent electrode 402a such as an ITO or the like is evaporation deposited onto the inner surface of the glass substrate. An orientation film 403a for giving a predetermined molecular orientation to the liquid crystal is further formed onto the inner surface of the transparent electrode 402a. A liquid crystal 404 having a birefringence such as a nematic liquid crystal or the like is sealed in a gap between the orientation films 403a.

The transparent electrode 402a has an electrode shape in which a circular aperture pattern 405 is cut out at the center. A voltage can be applied to only a portion except the circular aperture pattern 405.

Figure 4:
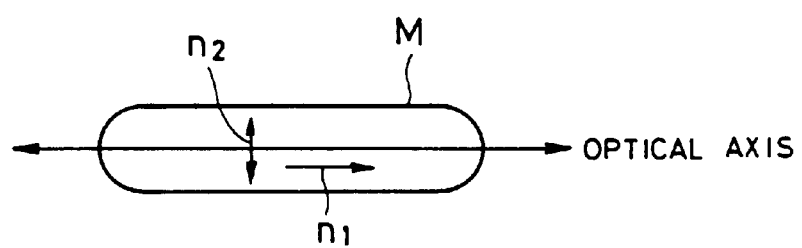
FIG. 4 is an explanatory diagram of a birefringence of a liquid crystal molecule.

A cell thickness (d) of the liquid crystal 404 which is sealed in the gap between the glass substrates 401a is set to a thickness which gives a phase difference of ¼ of a wavelength $\lambda$ or a value that is an odd number multiple of ¼ of the wavelength $\lambda$ to the laser beam passing through the liquid crystal, that is, a thickness which satisfies the condition of $\Delta n \cdot d = \lambda/4, 3\lambda/4, 5\lambda/4, \ldots$ when a birefringence of a liquid crystal molecule M is $\Delta n$ as shown in FIG. 4. In FIG. 4, n1 denotes a refractive index in the direction of an optical axis of the liquid crystal molecule M and n2 indicates a refractive index in the direction which crosses perpendicularly to the optical axis direction.

A molecule orientation has been given by the orientation film 403a to the liquid crystal 404 to be sealed in a manner such that the optical axis (refer to FIG. 4) of the liquid crystal molecule M is in parallel with the glass substrate when it is seen from the cross-sectional direction of FIG. 2A and the optical axis of the liquid crystal molecule M is set in the direction of 45°, that is, in the diagonal direction when it is seen from the plane direction shown in FIG. 2B. The optical axis direction of the liquid crystal molecule M gives a plane of polarization of a light. In the case of the liquid crystal panel 4 shown in FIGS. 2A and 2B, therefore, the plane of polarization is located in the diagonal direction (45° direction). As shown in FIG. 1, the liquid crystal panel 4 with such a construction is arranged in a manner such that a plane P of polarization crosses the plane P of polarization of the polarization beam splitter 2 at an inclination of 45°.

The operation of the optical pickup constructed as depicted above will now be described.

When data is reproduced or recorded from/to a DVD such as an SD, a DVD selection signal is supplied to the liquid crystal panel control circuit 9. When the DVD selection signal is supplied, no voltage is applied from the liquid crystal panel control circuit 9 to the liquid crystal panel 4. The state of the liquid crystal panel 4 in this instance is equivalent to a state that a switch SW in FIG. 2A is OFF. The sealed liquid crystal 404 remains in the parallel orientation state as shown in FIGS. 2A and 2B and the whole surface of the liquid crystal panel 4 functions as what is called a ¼ wavelength plate.

When the liquid crystal panel 4 is set so that the whole surface of the panel 4 functions as a ¼ wavelength plate as mentioned above, the whole laser beam B which is emitted from the laser light source 1 and passes through the liquid crystal panel 4 is converted from a linearly polarized light to a circularly polarized light. The laser beam B converted to the circularly polarized light is reflected by the optical disc 6 and again passes through the liquid crystal panel 4. The reflected beam, however, is returned from the circularly polarized light to the linearly polarized light in this instance.

The plane of polarization of the reflected beam returned to the linearly polarized light is rotated in the direction which crosses perpendicularly to the plane P of polarization of the polarization beam splitter 2 as shown by an arrow of a broken line in FIG. 1. The reflected beam from the optical disc 6 is reflected in the horizontal direction by the plane of polarization of the polarization beam splitter 2 and is sent to the photodetector 8 via the condenser lens 7.

As mentioned above, since the whole surface of the liquid crystal panel 4 functions as a ¼ wavelength plate and the whole reflection light is transmitted to the photodetector 8 when playing the DVD, the whole lens surface of the objective lens 5 is used. When a numerical aperture NA of the objective lens 5 at this time is, therefore, set to a value adapted to the DVD, for example, the numerical aperture NA=0.6 in the case of the SD, the DVD can be efficiently reproduced or recorded.

When recording is to be performed on the DVD, it is sufficient to raise an output power of the laser light source 1 and to optically modulate the laser beam B emitted from the laser light source 1 by recording information. In the case of a phase-change type disc, it is sufficient to merely irradiate the light modulated laser beam onto the disc plane. In the case of a magnetooptic disc, however, it is necessary to irradiate the light modulated laser beam and also to apply a magnetic field onto a spot surface of the disc by a magnetic field generating circuit (not shown).

On the other hand, in the case of reproducing data from the CD, a CD selection signal is supplied to the liquid crystal panel control circuit 9. When the CD selection signal is supplied, a predetermined voltage is applied to the transparent electrode 402a of the liquid crystal panel 4 from the liquid crystal panel control circuit 9. The liquid crystal panel 4 in this instance, therefore, is equivalent to a state where the switch SW in FIG. 3A is turned on.

Figure 3A:
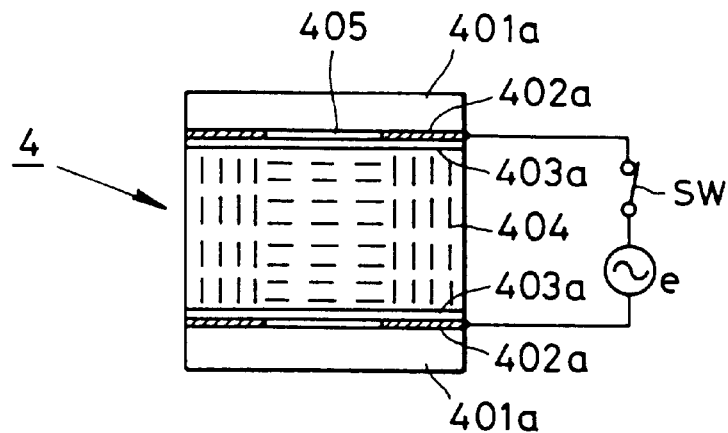
FIGS. 3A and 3B are explanatory diagrams of the operation when a voltage is applied to the liquid crystal panel of FIG. 2.
Figure 3B:
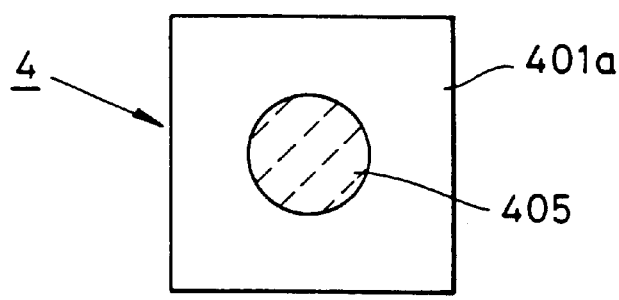

When the switch SW is "ON", since a voltage (e) is applied to the transparent electrode 402a, in the sealed liquid crystal 404 as shown in FIGS. 3A and 3B, only the liquid crystal in the transparent electrode 402a portion is oriented perpendicularly to the substrate and this portion doesn't function as a ¼ wavelength plate. Only the circular aperture pattern 405 portion, therefore, functions as a ¼ wavelength plate.

When only the circular aperture pattern 405 portion functions as a ¼ wavelength plate as mentioned above, only the laser beam which passes through the aperture pattern 405 portion is polarized and the laser beam which passes through the transparent electrode 402a portion is not polarized.

When performing the CD reproducing operation, therefore, only the laser beam which passes the circular aperture pattern 405 portion functioning as a ¼ wavelength plate is reflected in the horizontal direction by the surface of the polarization beam splitter 2 on which the polarization film is formed. The reflected beam is sent to the photodetector 8 via the condenser lens 7. The laser beam which has passed the transparent electrode 402a portion is not reflected by the surface with the polarization film of the polarization beam splitter 2 but passes the polarization beam splitter.

That is, such a state is equivalent to a state where in the laser beam which passes the objective lens 5, only the laser beam which passes the lens' outer peripheral portion having a large aberration is cut out, resulting the numerical aperture NA of the objective lens 5 being reduced by an amount corresponding to the cut-out laser beam. When the shape of the aperture pattern 405 is set so that the numerical aperture NA of the objective lens 5 in this instance is equivalently set to a value adapted to the CD, for example, NA=about 0.37 (when the laser wavelength which is used is equal to 650 nm), the CD can be efficiently reproduced by using the same optical pickup as that of the DVD.

An optical anisotropy, that is, the birefringence An (FIG. 4) of the liquid crystal panel 4 mentioned above changes due to a change in the temperature at which it is used, a variation in the cell thickness (d) (FIG. 2A), or the like. Especially, it largely changes due to the temperature change. A voltage which gives a phase difference corresponding to the ¼ wavelength plate to the liquid crystal panel 4 and a voltage which gives no phase difference, therefore, will change. When the voltage that is applied to the liquid crystal panel 4 is set at a fixed value, the performance of the liquid crystal panel 4 deteriorates due to the change in the using temperature, the variation in the cell thickness, or the like, and the efficiency in the use of the light deteriorates. An example of the optical pickup which can eliminate such a problem and can set the applied voltage to the optimum value will now be described hereinafter.

Figure 5:
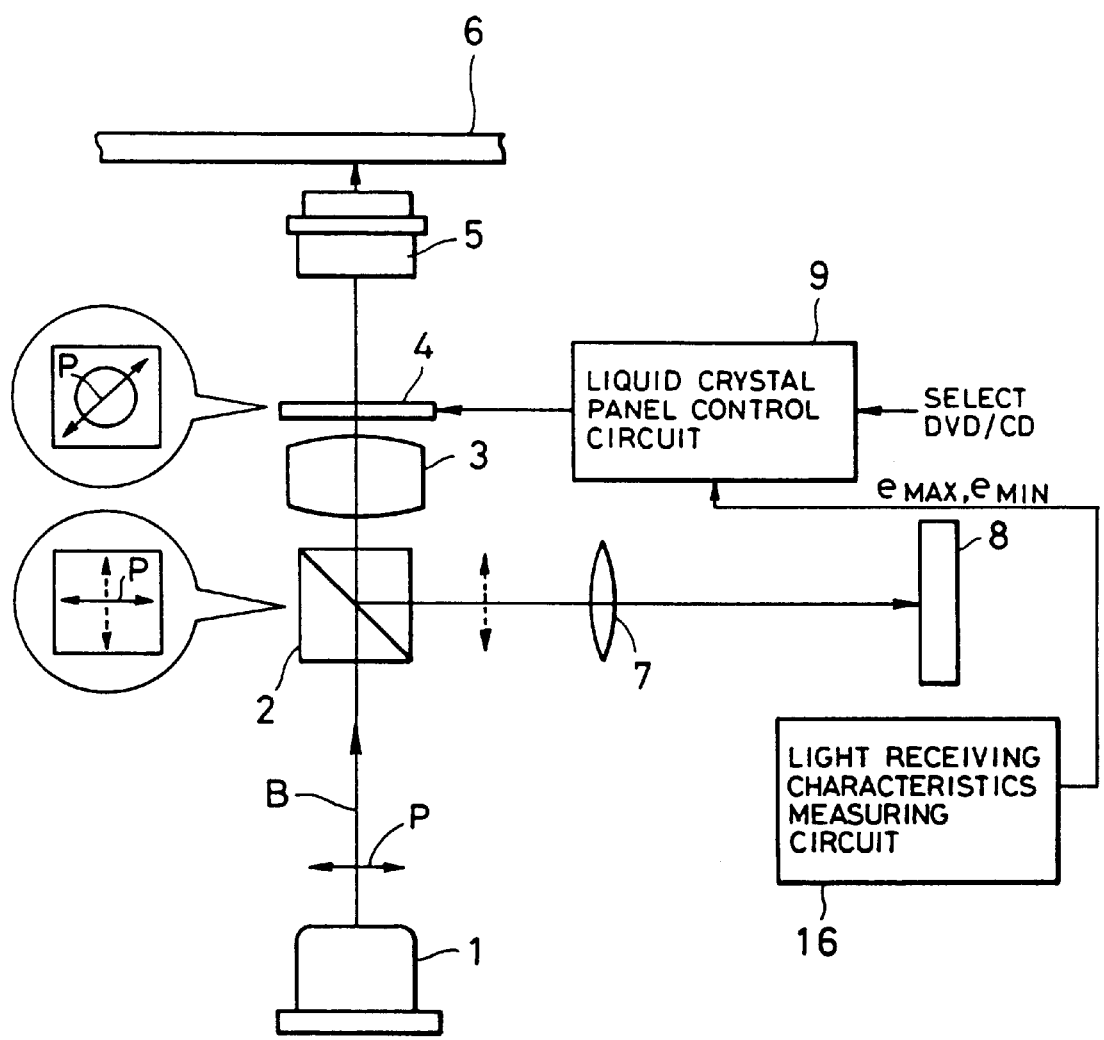
FIG. 5 is a diagram showing the construction of an example of an optical pickup in which an applied voltage of the liquid crystal panel can be varied.
Figure 6A:
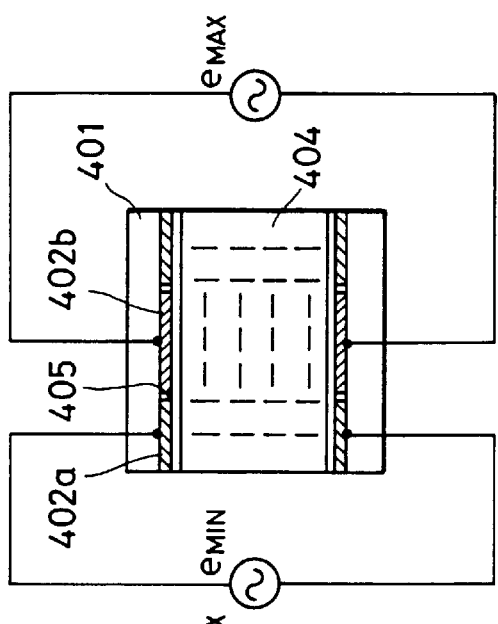
FIGS. 6A, 6B, and 6C are diagrams showing a structure of a liquid crystal panel 4 in FIG. 5.
Figure 6B:
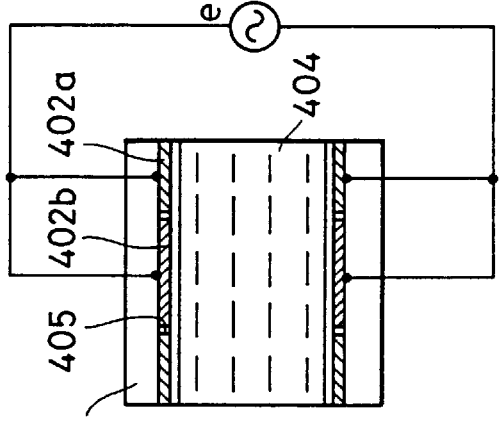
Figure 6C:
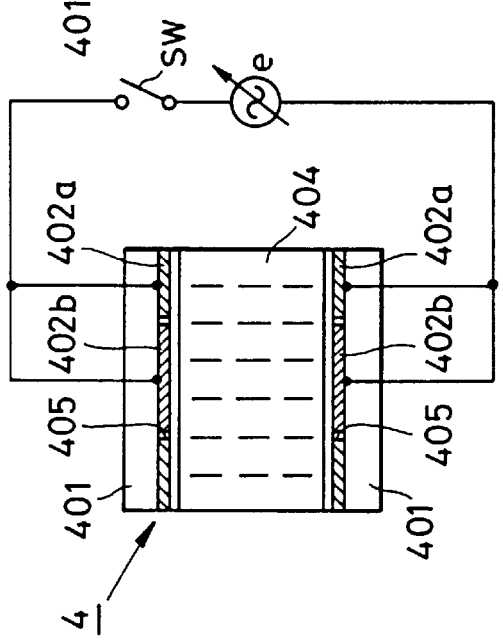

FIG. 5 shows the second embodiment of the optical pickup according to the invention and shows a case where the applied voltage of the liquid crystal panel can be variably controlled to the optimum value. FIG. 6 shows an example of a structure of a liquid crystal panel which is used for the optical pickup. In the diagrams, the same or corresponding component elements as those shown in FIGS. 1, 2A, and 2B are designated by the same reference numerals and their detailed descriptions will not be repeated here. As liquid crystal panels shown in FIGS. 6A, 6B, and 6C, a case of using a liquid crystal panel of a vertical orientation structure is used in contrast to the liquid crystal panel of the parallel orientation structure of FIGS. 2A and 2B.

In order to variably control the applied voltage of the liquid crystal panel 4 to the optimum value, a light receiving characteristics measuring circuit 16 for measuring the relation between the applied voltage to the liquid crystal panel 4 and the light reception amount of the photodetector 8 is newly provided as shown in FIG. 5 and a transparent electrode 402b for applying a voltage is newly formed in the circular aperture pattern 405 portion formed in the center of the transparent electrode 402a as shown in FIG. 6A.

In such a structure, it is sufficient to use the following method in order to set the applied voltage of the liquid crystal panel 4 to the optimum value according to the ambient temperature and the liquid crystal cell thickness at that time.

That is, when the optical disc 6 is set, first of all, the liquid crystal panel control circuit 9 sets the circuit so that the voltage can be applied to both of the transparent electrodes 402a and 402b of the liquid crystal panel 4 as shown in FIG. 6A, irrespective of the type of DVD/CD, and the switch SW is turned on in such a state, and the applied voltage (e) is gradually increased from 0 V. A change in light reception amount of the photodetector 8 when the applied voltage (e) is changed is measured by the light receiving characteristics measuring circuit 16.

Figure 7:
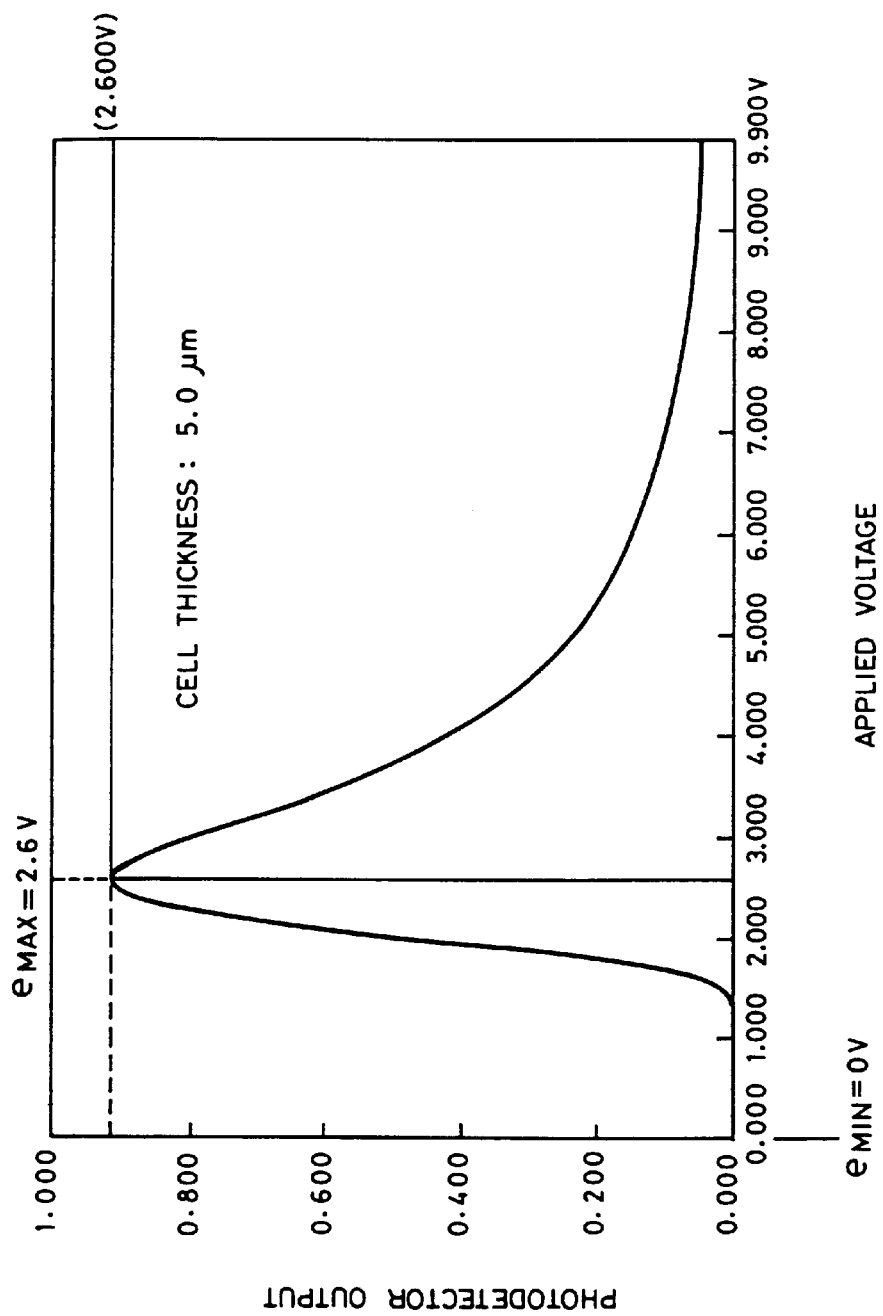
FIG. 7 is a graph showing characteristics between an applied voltage of a liquid crystal panel having a cell thickness of 5.0 $\mu$m and a light reception amount.
Figure 8:
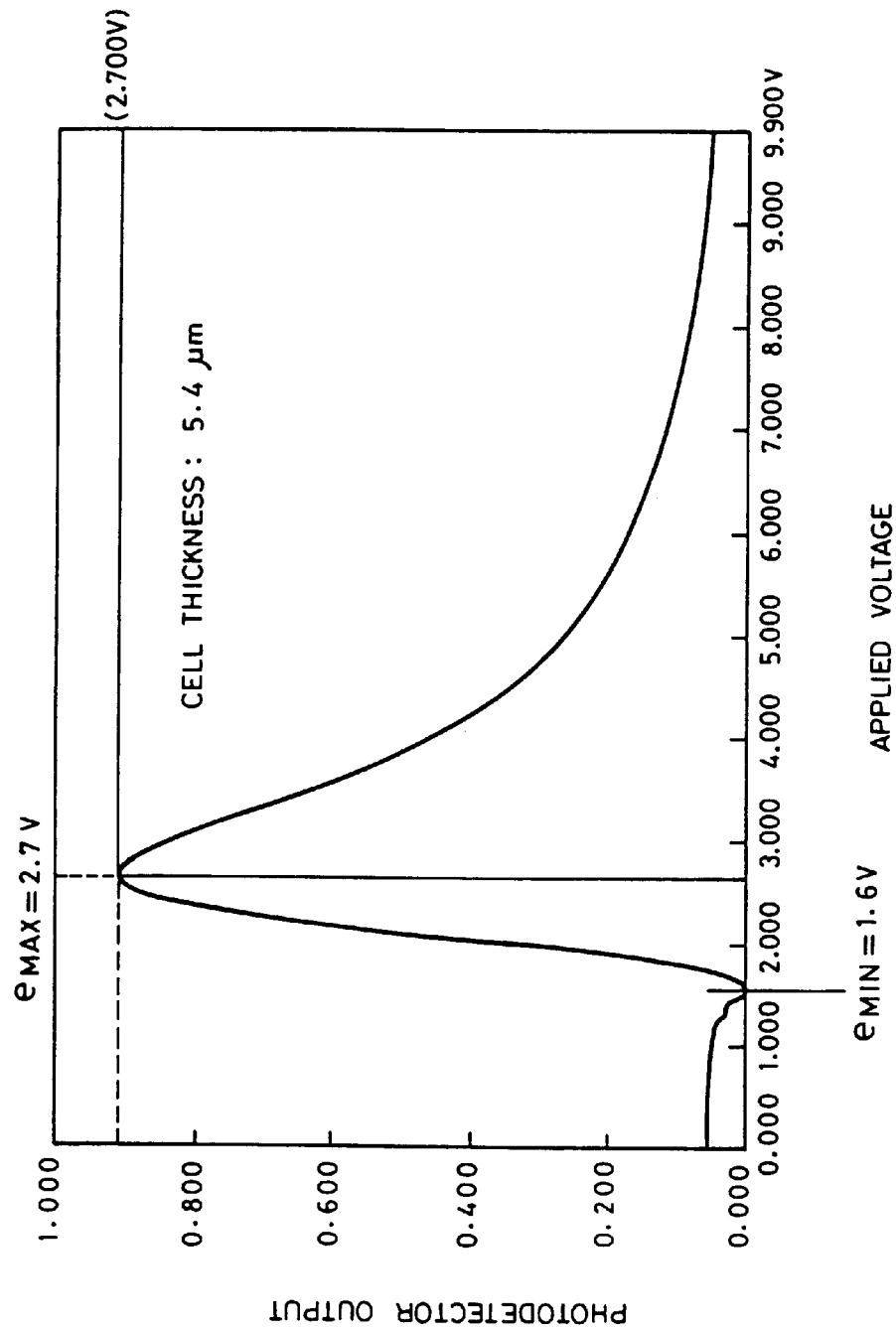
FIG. 8 is a graph showing characteristics between an applied voltage of a liquid crystal panel having a cell thickness of 5.4 $\mu$m and a light reception amount.

When the applied voltage (e) is changed as mentioned above, for example, applied voltage—light reception amount characteristics as shown in FIGS. 7 and 8 are obtained in the light receiving characteristics measuring circuit 16. FIG. 7 shows a case where the cell thickness (d) of the liquid crystal panel 4 is equal to 5.0 μm. FIG. 8 shows a case where the cell thickness of the liquid crystal panel 4 is equal to 5.4 μm.

When the applied voltage—light reception amount characteristics as shown in FIG. 7 or 8 are obtained, the light receiving characteristics measuring circuit 16 obtains a voltage $e_{MAX}$ which gives the maximum light reception amount and an applied voltage $e_{MIN}$ which gives the minimum light reception amount from the characteristics curve. In the case of FIG. 7, $e_{MAX}$ is equal to 2.6 V and $e_{MIN}$ is equal to 0 V. In the case of FIG. 8, $e_{MAX}$ is equal to 2.7 V and $e_{MIN}$ is equal to 1.6 V.

When the optical disc 6 being set is a DVD, as shown in FIG. 6B, the voltage $e_{MAX}$ (2.6 V in case of FIG. 7 or 2.7 V in case of FIG. 8) which gives the maximum light reception amount is applied to both of the transparent electrodes 402a and 402b. The whole surface of the liquid crystal panel 4 consequently enters a state of the maximum light reception amount, that is, a state in which it functions most as a ¼ wavelength plate and a state in which the use efficiency of the light is highest.

When the set optical disc 6 is a CD, it is necessary to make only the circular aperture pattern 405 portion function as a ¼ wavelength plate in order to reduce the numerical aperture NA as mentioned above.

When the set optical disc 6 is a CD, as shown in FIG. 6C, the voltage $e_{MIN}$ (0 V in case of FIG. 7 or 1.6 V in case of FIG. 8) which gives the minimum light reception amount is applied to the transparent electrode 402a in the peripheral portion and the voltage $e_{MAX}$ (2.6 V in the case of FIG. 7 or 2.7 V in case of FIG. 8) which gives the maximum light reception amount is applied to the transparent electrode 402b in the circular aperture pattern 405 portion. Consequently, only the circular aperture pattern 405 portion of the liquid crystal panel 4 enters a state of the largest light reception amount, that is, a state in which it functions most as a ¼ wavelength plate. The ambient transparent electrode 402a portion enters a state of the smallest light reception amount and a state in which the efficiency in use of the light is highest.

In the above description, when the set optical disc is a CD, the voltage $e_{MIN}$ which gives the minimum light reception amount and the voltage $e_{MAX}$ which gives the maximum light reception amount have immediately been applied to the transparent electrodes 402a and 402b. In place of such a method, it is also possible to construct the pikcup in a manner such that the voltage $e_{MIN}$ which gives the minimum light reception amount is first applied to only the transparent electrode 402a and, in a state where the minimum voltage $e_{MIN}$ has been applied, the applied voltage to the transparent electrode 402b in thecircular aperture pattern 405 portion is again changed from 0 V to a predetermined voltage and that the voltage $e_{MAX}$ which gives the maximum light reception amount obtained at this time is applied to the transparent electrode 402b. In this manner, only the circular aperture pattern 405 portion can be allowed to more accurately function as a ¼ wavelength plate.

Figure 9:
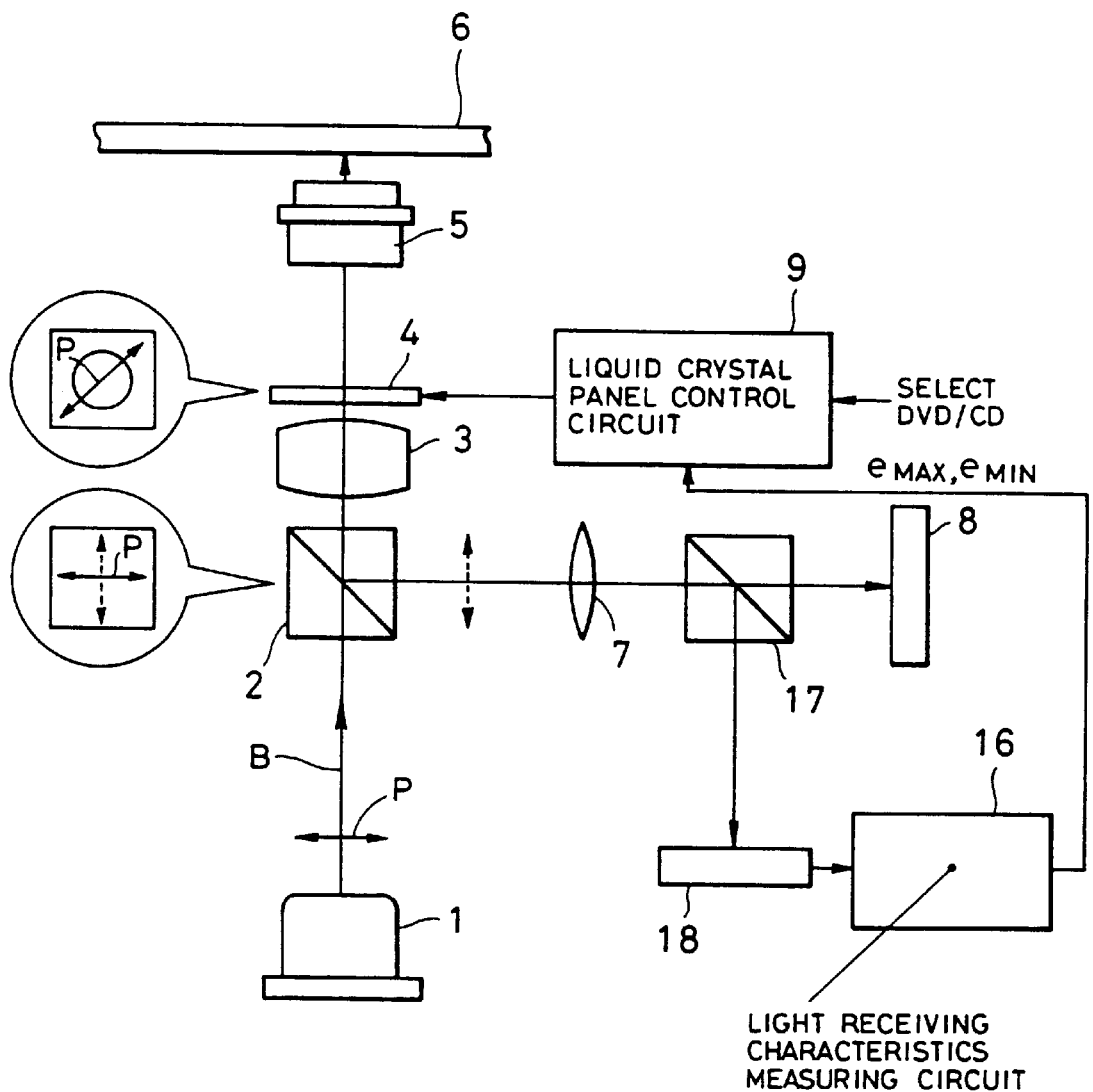
FIG. 9 is a diagram showing a modification of the optical pickup of FIG. 5.

FIG. 9 shows the third embodiment of the optical pickup according to the invention. The third embodiment is a modification of the optical pickup shown in FIG. 5. The optical pickup of FIG. 9 has substantially the same construction as that of the optical pickup of FIG. 5 except that an exclusive-use beam splitter 17 and a photodetector 18 for obtaining the applied voltage—light reception amount characteristics of the liquid crystal panel 4 are provided in front of the photodetector 8. A part of the reflected beam is extracted by the beam splitter 17 and is sent to the photodetector 18. The light receiving characteristics measuring circuit 16 obtains the applied voltage—light reception amount characteristics as shown in FIG. 7 or 8 from a light reception signal of the photodetector 18.

In case of the optical pickup of FIG. 9, since a light receiving state can be always monitored by the independent photodetector 18, when the light reception amount is fluctuated alot during the reproduction, the light reception amount can be corrected so as to achieve a maximum by gradually changing the applied voltage to the liquid crystal panel 4. In the case of the circuit of FIG. 9, since the recording signal is reproduced by a light reception signal of the first photodetector 8, it is preferable to set a beam distribution amount to the second photodetector 18 by the second beam splitter 17 to a value as small as possible so as not to deteriorate the S/N ratio.

Figure 10:
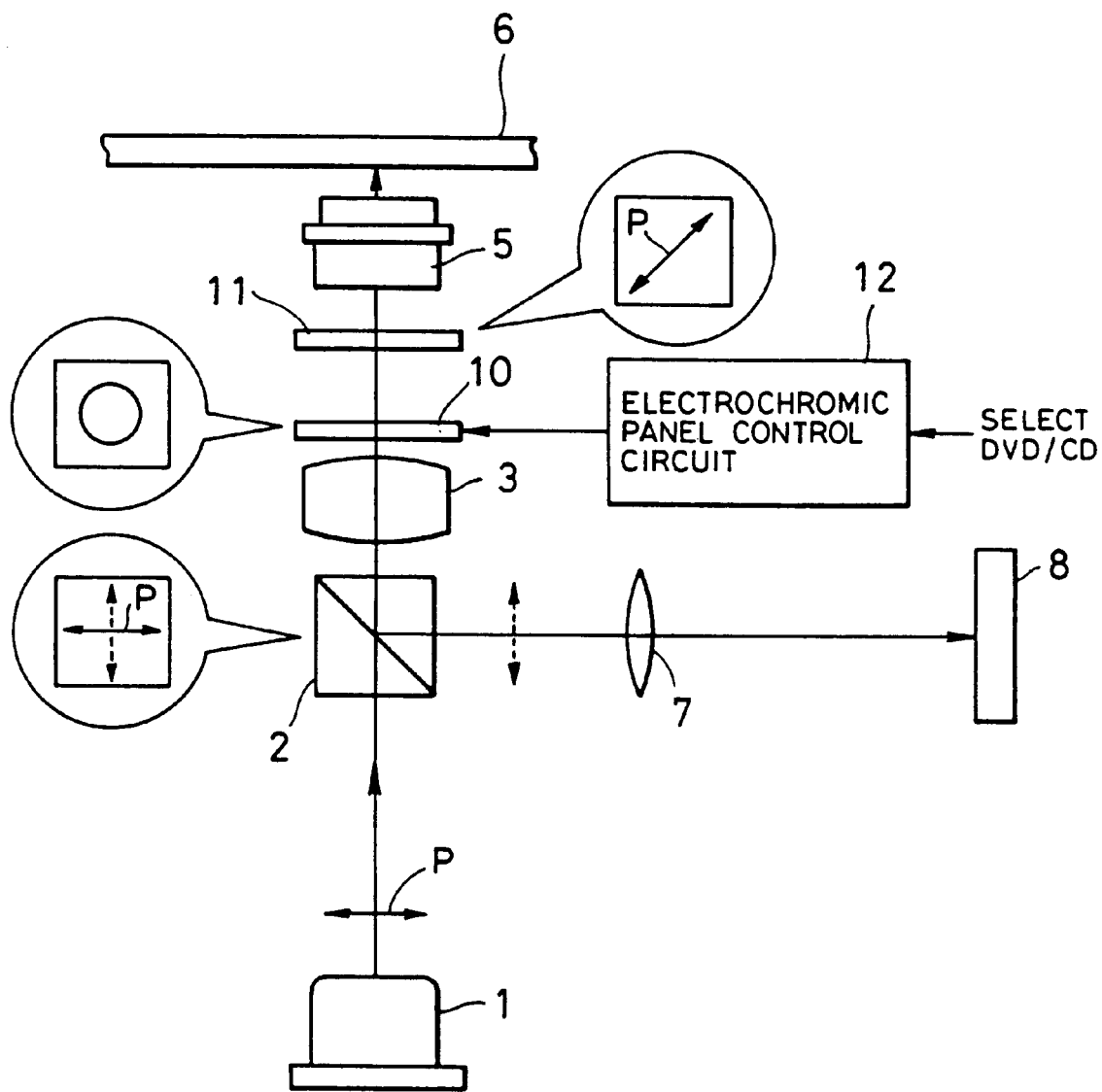
FIG. 10 is a constructional diagram showing the second embodiment of the optical pickup according to the invention.

FIG. 10 shows the fourth embodiment of the optical pickup according to the invention.

The fourth embodiment shows an example in a case where an electrochromic panel 10 of a transmission type is used as an electrical diaphragm means in place of the liquid crystal panel 4 in the optical pickup of FIG. 1.

The electrochromic panel 10 can only switch the transmission or the non-transmission of the light and doesn't have a function as a ¼ wavelength plate like the foregoing liquid crystal panel. When using the electrochromic panel 10, therefore, it is necessary to again separately provide a ¼ wavelength plate 11 as shown in the diagram. Reference numeral 12 denotes an electrochromic panel control circuit. In FIG. 10, the same or corresponding component elements as those in FIG. 1 are designated by the same reference numerals and their descriptions are omitted here.

Figure 11A:
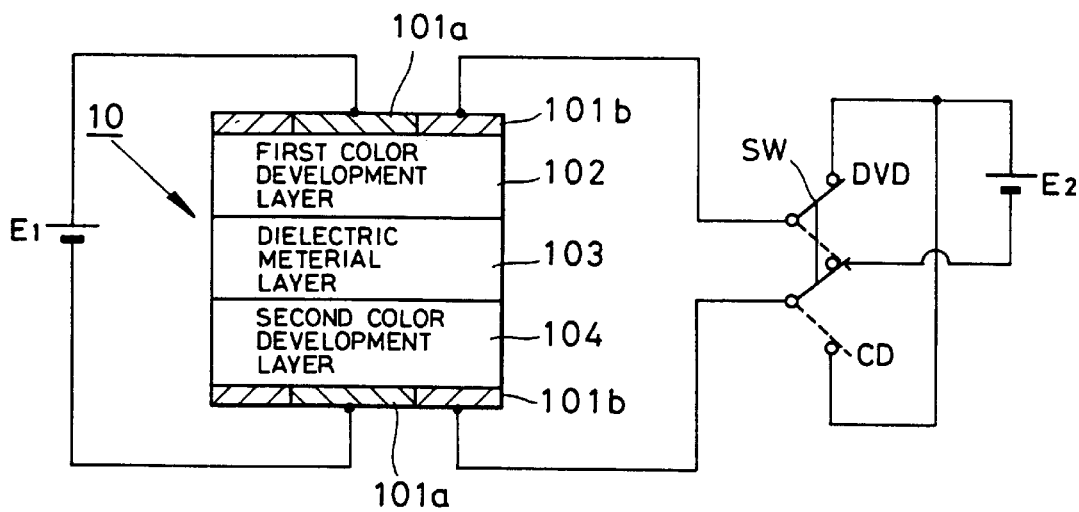
FIGS. 11A, 11B, and 11C are explanatory diagrams of an electrochromic panel in FIG. 10.
Figure 11B:
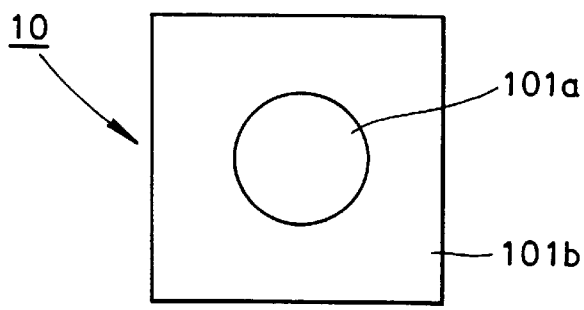
Figure 11C:
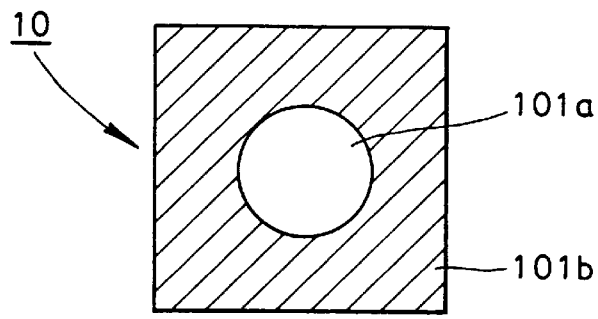

FIG. 11 shows a structure of the electrochromic panel 10.

The electrochromic panel 10 is formed by sandwiching a first color development layer 102, a dielectric material layer 103, and a second color development layer 104 between transparent electrodes such as ITO or the like. The electrochromic panel 10 becomes transparent or opaque by changing the direction of a DC voltage which is applied to the transparent electrodes.

When the electrochromic panel 10 is used as a diaphragm means of the invention, the transparent electrodes are patterned as a first transparent electrode 101a presenting a circular aperture pattern and a second transparent electrode 101b which surrounds the first transparent electrode 101a. A DC voltage $E_1$ is always applied to the transparent electrode 101a portion with the circular aperture pattern in the direction such that the transparent electrode 101a becomes transparent. On the other hand, the direction of a voltage $E_2$ which is applied to the transparent electrode 101b in the outer peripheral portion can be changed by the switch SW.

The operation of the optical pickup of FIG. 10 using the electrochromic panel 10 will now be described. When reproducing or recording data from/to the DVD such as an SD or the like, the DVD selection signal is supplied to the electrochromic panel control circuit 12. When the DVD selection signal is supplied, the voltage is applied from the control circuit 12 to the electrochromic panel 10 in the direction such that the whole panel becomes transparent.

That is, a state of the electrochromic panel 10 in this instance is equivalent to a state where the switch SW in FIG. 11A is switched to the DVD side. When the switch SW is on the DVD side, the voltage is applied so that the upper electrode of the transparent electrodes 101a and 101b has a positive potential and the whole surface of the electrochromic panel 10 becomes transparent as shown in FIG. 11B.

Since the laser beam is not shielded by the electrochromic panel 10, the whole surface of the objective lens 5 is used. By setting the numerical aperture NA of the objective lens 5 in this instance to a value adapted to the DVD, the DVD can be efficiently reproduced or recorded.

Since the plane of polarization of the laser beam which reciprocated and passed the ¼ wavelength plate 11, twice is rotated in the direction which crosses perpendicularly to the plane of polarization of the polarization beam splitter 2, the reflection beam from the optical disc 6 is reflected by the plane of polarization of the polarization beam splitter 2 and is transmitted to the photodetector 8 via the condenser lens 7.

When reproducing the CD, the CD selection signal is supplied to the electrochromic panel control circuit 12. When the CD selection signal is supplied, the direction of the voltage applied to the transparent electrode 101b of the electrochromic panel 10 is reversed by the electrochromic panel control circuit 12.

A state of the electrochromic panel 10 in this instance is equivalent to a state where the switch SW in FIG. 11A is switched to the CD side. When the switch SW is on the CD side, as shown in FIG. 1C, the transparent electrode 101a portion with the circular aperture pattern is transparent and the transparent electrode 101b in the outer peripheral portion is opaque.

It is, therefore, equivalent to a state where only the laser beam which passes the outer peripheral portion of the lens of a large aberration in the laser beam which passes the objective lens 5 is cut, so that the numerical aperture NA of the objective lens 5 is reduced by an amount corresponding to such a cut beam. When the aperture patterns of the transparent electrodes 101a and 101b of the electrochromic panel 10 are set so that the numerical aperture NA of the objective lens 5 in this instance has a value adapted to the CD, then therefore, the CD can be efficiently reproduced by the same optical pickup as that of the DVD.

A liquid crystal panel which uses an electrochemical effect and doesn't have the function of the ¼ wavelength plate, for example, a liquid crystal panel of a GH type, a liquid crystal panel of a phase transition type, a liquid crystal panel of a DS type, or the like can be also used in place of the electrochromic panel 10.

The embodiments described above have been shown with respect to the case where one circular aperture pattern is formed in the transparent electrode of the liquid crystal panel 4 or the electrochromic panel 10 and such an aperture pattern is turned on or off by the applied voltage. Since an actual optical disc has, however, an eccentricity and the objective lens 5 always moves in the radial direction of the disc by a tracking servo, the optical axis (the center of the pupil) of the objective lens 5 and the aperture center of the circular aperture pattern are deviated when the CD is reproduced, so that there is a fear of deterioration of the performance of the optical pickup.

In order to avoid such a problem, it is sufficient to integratedly construct the liquid crystal panel 4 or electrochromic panel 10 and the objective lens 5 and simultaneously move both of the liquid crystal panel 4 or electrochromic panel 10 and the objective lens 5 by the tracking servo. The size of the liquid crystal panel 4 or electrochromic panel 10 cannot be reduced to a size of a certain extent or less and its weight cannot be lightened to a certain extent or less, so that it is impossible to integratedly construct such a panel with the objective lens 5 and to simultaneously move them.

Figure 12:
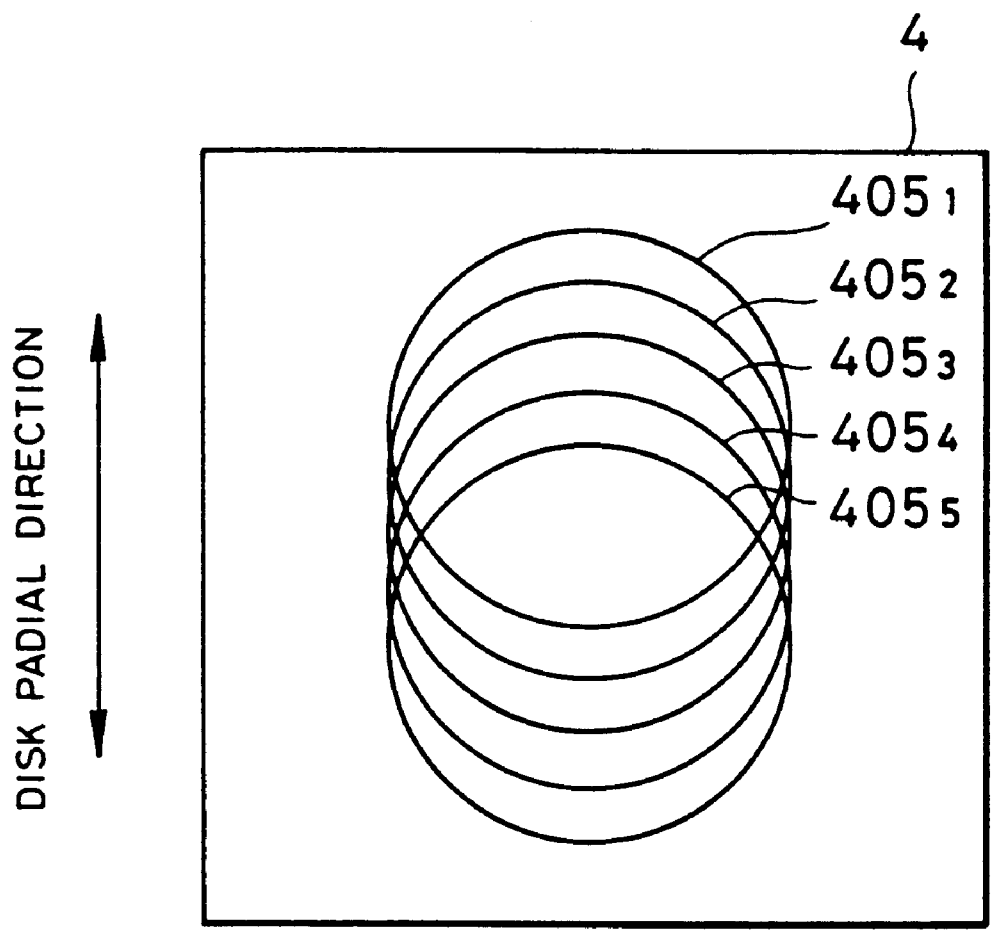
FIG. 12 is a diagram showing an example of a liquid crystal panel in which a plurality of aperture patterns are formed.

FIG. 12 shows an example of the optical pickup to solve such a problem. FIG. 12 relates to a case where the invention is applied to the optical pickup using the liquid crystal panel 4 in FIG. 1. A plurality of aperture patterns, namely, five aperture patterns $405_1$ to $405_5$ in the example of FIG. 12 are formed so as to be slightly deviated from each other in the radial direction of the disc. When the objective lens 5 and the aperture center of the aperture pattern are deviated when reproducing the CD, the aperture pattern whose aperture center most coincides with the optical axis of the objective lens 5 is selected from the plurality of aperture patterns and is made to function as a ¼ wavelength plate.

Figure 13:
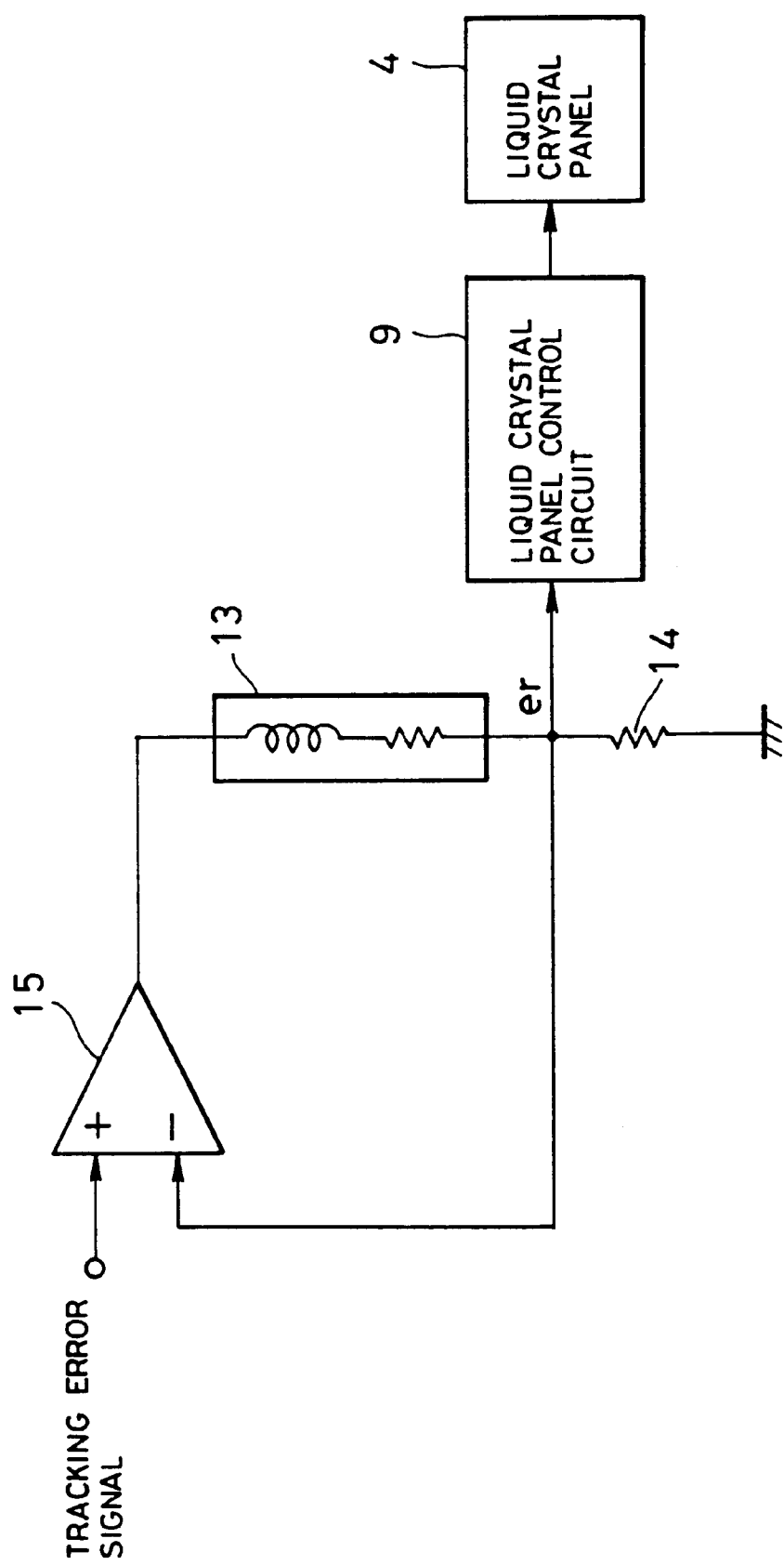
FIG. 13 is a diagram showing the construction of the example of an electric circuit for controlling an applied voltage of the liquid crystal panel of FIG. 12.

In order to select the aperture pattern whose aperture center most coincides with the optical axis of the objective lens 5 among the plurality of aperture patterns, as shown in FIG. 13, a return voltager of a tracking error signal which is supplied to a tracking error actuator 13 of the objective lens 5 is used as a control signal of the liquid crystal panel control circuit 9 and the aperture patterns $405_1$ to $405_5$ are switched in accordance with the motion of the objective lens 5 by the tracking servo.

That is, in FIG. 13, reference numeral 4 denotes the liquid crystal panel; 9 the liquid crystal panel control circuit; 13 the tracking actuator; 14 a return resistor; and 15 a subtracter. The tracking error signal obtained by a tracking servo circuit (not shown) is transmitted to the tracking actuator 13 via the subtracter 15. The tracking actuator 13 moves the objective lens 5 (FIG. 1) in the radial direction in accordance with the tracking signal. The movement amount of the objective lens 5 is returned as a return voltage $e_r$ which is generated across the return resistor 13 to the subtracter 15 and the control is executed so that the tracking error is equal to zero.

The return voltage $e_r$ is also sent to the liquid crystal panel control circuit 9. The liquid crystal panel control circuit 9 obtains the movement amount of the objective lens 5 at that time from the return voltage $e_r$, selects one of the aperture patterns $405_1$ to $405_5$ in accordance with the movement amount and corrects the positional deviation between the optical axis of the objective lens 5 and the aperture center of the aperture pattern.

Figure 14A:
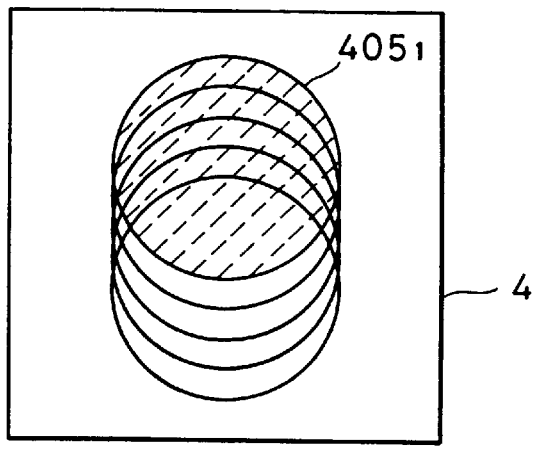
FIGS. 14A, 14B, and 14C are explanatory diagrams of switching states of the aperture patterns of the liquid crystal panel of FIG. 12.
Figure 14B:
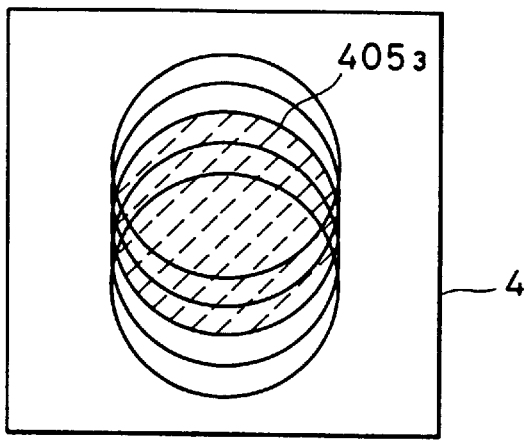
Figure 14C:
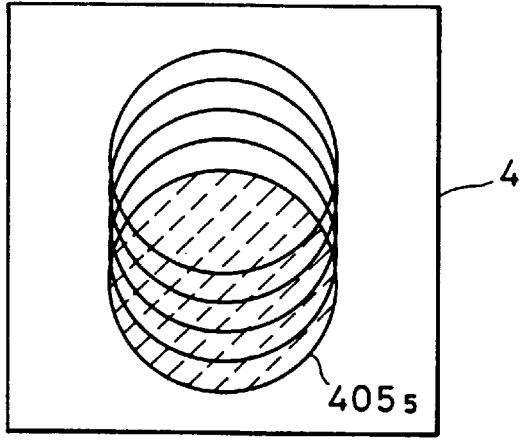

By the arrangement as mentioned above, the position of the aperture pattern which functions as a ¼ wavelength plate can be changed in accordance with the motion of the objective lens as shown in FIG. 14. Even if the objective lens 5 is moved in the radial direction of the disc by the tracking servo, the optical axis of the objective lens 5 and the aperture center of the aperture pattern of the liquid crystal panel 4 can be always made to coincide, so that the deterioration of the performance of the optical pickup in association with the positional deviation of the optical axis of the objective lens 5 and the aperture pattern of the liquid crystal panel 4 can be prevented. The arrangement of FIGS. 12 and 13 can be also similarly applied to the optical pickup using the electrochromic panel 10 in FIG. 10.

Although the circular pattern has been used as an aperture pattern for a diaphragm in each of the examples, the shape of the aperture pattern is not limited to the circular shape. As long as the optimum numerical aperture NA for the CD reproduction is given, for example, aperture patterns in other shapes such as oval pattern, square pattern, rectangular pattern, and the like can be also used.

As a DVD, there are a read only DVD (hereinlater, referred to as a DVD-ROM) and a DVD capable of both recording and reproduction (hereinafter, referred to as a DVD-RAM). When data is recorded on the DVD-RAM such as a phase transition disc, magnetooptic disc, or the like, a light power of about 10 mV or more is usually necessary as an objective emitting power. Since light output of the laser is limited, however, it is necessary to reduce losses in the optical system as much as possible and to enhance a light coupling efficiency as much as possible.

Figure 15:
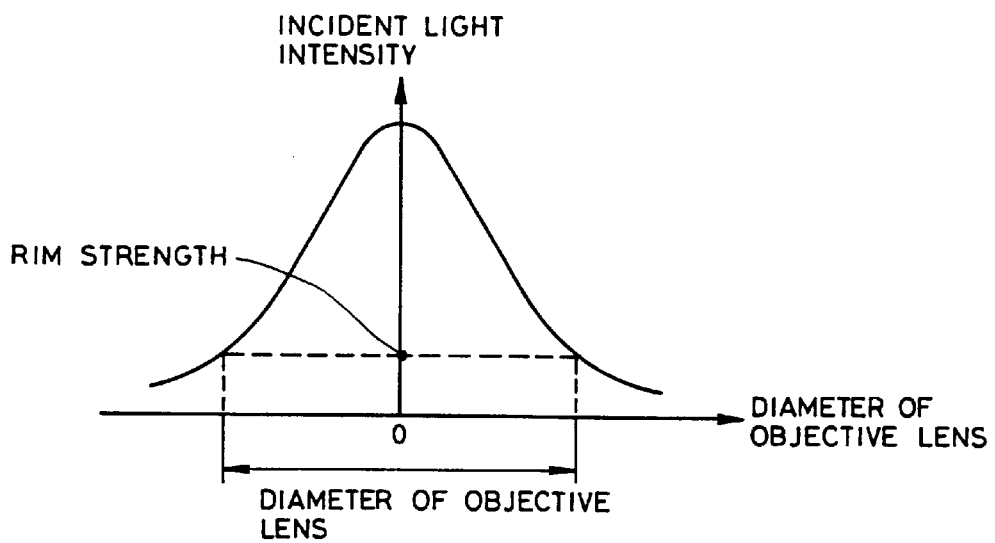
FIG. 15 is a graph showing characteristics of an incident light distribution of an objective lens in a conventional optical pickup.

In the conventional optical pickup for recording, in order to realize the light coupling efficiency, an emission pattern of the laser beam is shaped by using a prism for shaping the beam or a short focal point collimator lens, thereby raising the light coupling efficiency. With such a structure, an intensity distribution of the light which enters the objective lens is corrected and a high rim intensity (refer to FIG. 15) of the light which enters the objective lens can be obtained, so that there is an advantage such that the shape of the beam spot on the disc can be set almost to a circle. Since the beam shaping prism and the short focal point collimator lens are necessary, there are problems such that the number of parts increases and the costs rise and the shape also increases. Since the short focal point collimator lens is used, there is a problem such that a severe adjustment of the precision of the optical system is required.

When the conventional optical pickup for reproduction (which doesn't use the liquid crystal panel as in the present invention) is also commonly used for recording, since the light coupling efficiency of the optical pickup for reproduction is poor, it is necessary to raise the light coupling efficiency by using a collimator lens of a focal distance which is slightly shorter although it is not as short as that of the optical pickup for recording only. When the collimator lens of a short focal distance is used, the rim intensity in the minor axis direction of a radiation intensity distribution (oval pattern) of the semiconductor laser becomes too low and there arises a drawback that the spot that is focused onto the disc cannot be converged to be small enough.

The problem that the spot cannot be fully converged hardly exerts an influence on the recording and reproduction of the DVD-RAM in which a recording density is slightly low. With respect to the read only DVD-ROM of a high recording density, a problem occurs such that the spot diameter is too large as compared with the recording density. The optical pickup of the invention using the liquid crystal panel can be also applied to the DVD-ROM of a high recording density without causing such a problem. This point will now be described below.

In order to also apply the optical pickup of the invention to the DVD-ROM having a high recording density without causing the above problem, it is sufficient to control the applied voltage to the liquid crystal panel 4 as follows in the optical pickup shown in FIGS. 1, 2A, and 2B. In this case, a transparent electrode similar to the transparent electrode 402*b* in FIGS. 6A, 6B, and 6C is also needed to be formed in the circular aperture pattern 405 portion formed in the center portion of the liquid crystal panel 4 shown in FIGS. 2A and 2B.

In the case of the DVD-RAM in which the recording density is so small that it hardly causes a problem, as described in FIGS. 1, 2A, and 2*b*, it is sufficient to merely make the whole surface of the panel function as a ¼ wavelength plate without applying a voltage to the liquid crystal panel 4. By such an operation, since the spot diameter is sufficiently converged to an extent corresponding to the DVD-RAM, the reproduction and recording can be executed in such a state.

Figure 16:
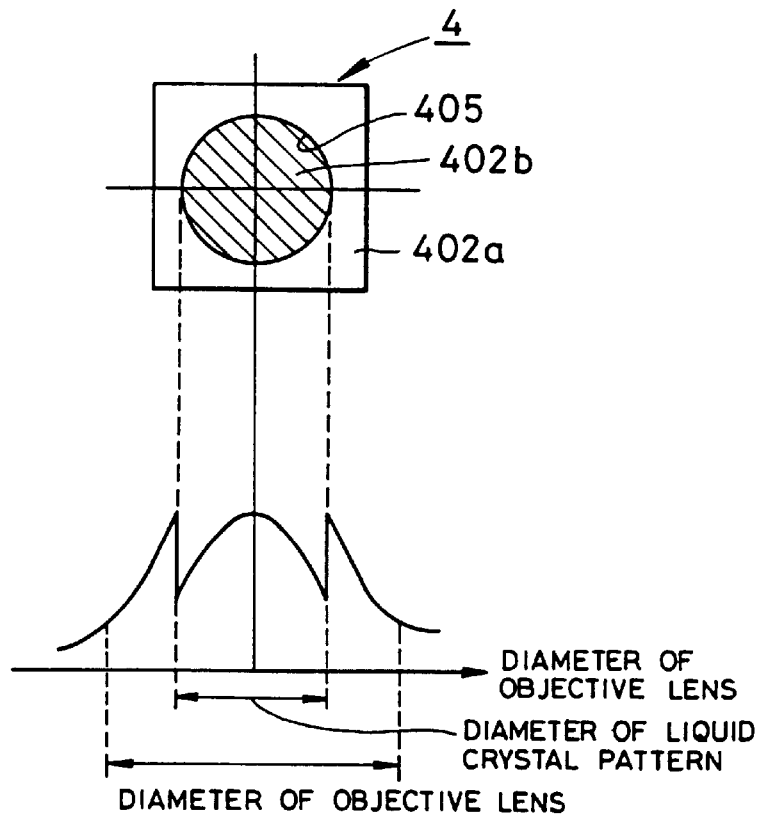
FIG. 16 is a characteristics diagram of an incident light distribution of an objective lens in an optical pickup of the invention.

When reproducing the DVD-ROM in which the recording density is high and there is a fear of occurrence of the problem as mentioned above, the light amount of the aperture pattern 405 portion in the center portion of the liquid crystal panel 4 is attenuated by a predetermined amount and incident light intensity characteristics as shown in FIG. 16 are given. In order to give such characteristics, it is sufficient to control the voltage applied to the transparent electrode 402b in the aperture pattern 405 portion in the center portion of the liquid crystal panel 4 and to attenuate the light which passes this portion by a predetermined amount. When the amount of the transmission light of the aperture pattern 405 portion in the center portion of the liquid crystal panel 4 is reduced as mentioned above, the rim intensity equivalently increases, so that the spot diameter can be converged by an amount corresponding to the increase in the rim intensity and data recorded in the DVD-ROM at a high density can be also easily reproduced.

FIGS. 17A to 17D show the relation between the rim intensity and the spot diameter. The diagrams relate to a case where the laser wavelength $\lambda=650$ nm and the numerical aperture NA of the objective lens=0.6.

Figure 17A:
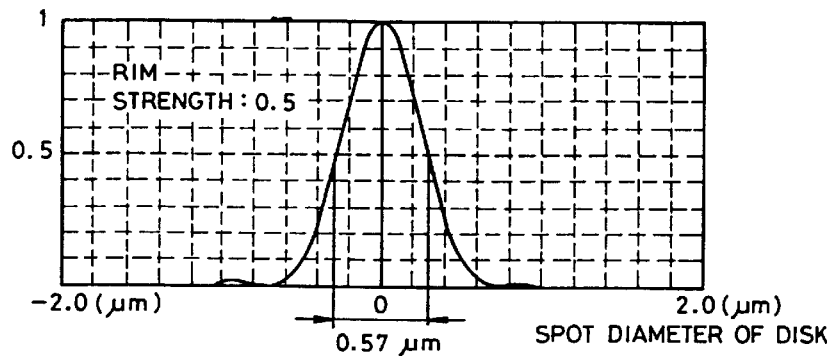
FIGS. 17A, 17B, 17C, and 17D are diagrams each showing the relation between a rim strength and a spot diameter.
Figure 17B:
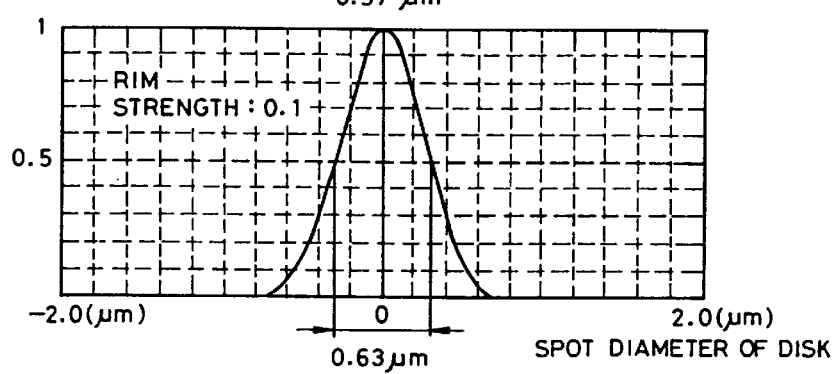

FIGS. 17A and 17B show the cases of the conventional optical pickup. FIG. 17A relates to the case where the rim intensity is set to 0.5 and the full width at half maximum of the spot diameter in this instance is equal to 0.57 $\mu$m. FIG. 17B relates to the case where the rim intensity is set to 0.1 and the full width at half maximum of the spot diameter in this instance is equal to 0.63 $\mu$m. As mentioned above, in case of the conventional optical pickup, when the rim intensity decreases, the spot diameter increases, so that it exerts an influence on the reproduction of the high-density disc.

Figure 17C:
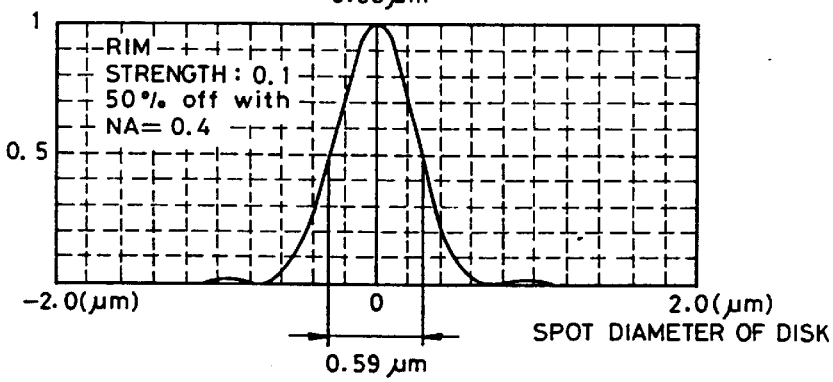
Figure 17D:
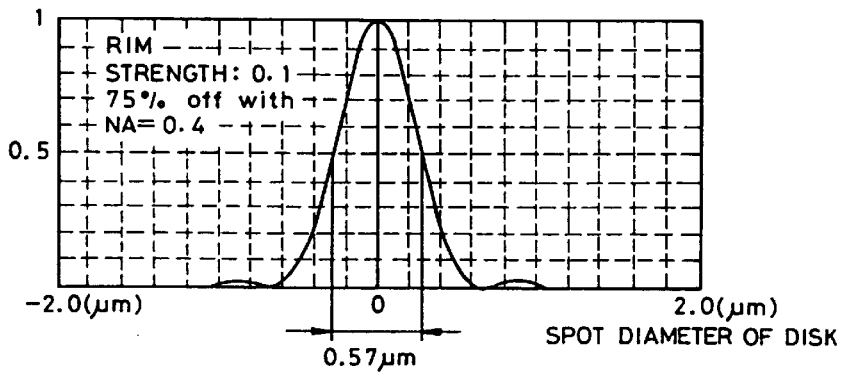

FIGS. 17C and 17D show the cases of the optical pickup of the invention. FIG. 17C relates to the case where the rim intensity is set to 0.1 and the light amount corresponding to a portion of the numerical aperture NA of the objective lens=0.4 is set to 50% and the full width at half maximum of the spot diameter in this instance is equal to 0.59 $\mu$m. FIG. 17D relates to the case where the light amount corresponding to a portion of the numerical aperture NA of the objective lens=0.4 is set to 25% and the full width at half maximum of the spot diameter in this instance is equal to 0.57 $\mu$m. As will be obviously understood from the diagram, the spot diameter can be reduced by dropping the light amount of the center portion and the data recorded in DVD-ROM at a high density can be reproduced without a fear of generation of errors.

Although, in this case, the coupling efficiency of the light deteriorates since the light amount is attenuated and the light power decreases, the power of the laser light source 1 is sufficient because this arrangement is used for the reproducing operation which doesn't require a high light power. If the reduced amount of the coupling efficiency is compensated by increasing the output power of the laser light source 1, the light power necessary for reproduction can be assured.

Figure 18A:
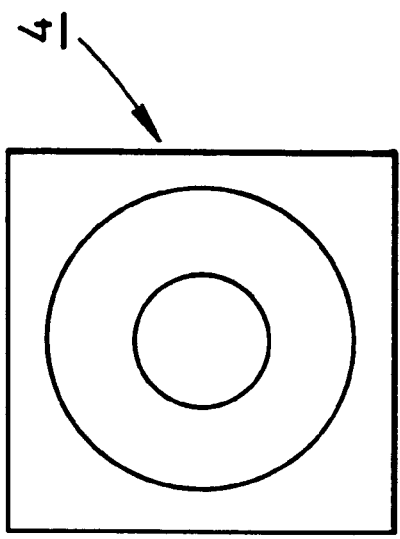
FIGS. 18A, 18B, and 18C are diagrams showing other examples of aperture patterns of a liquid crystal panel which is used in the optical pickup of the invention.
Figure 18B:
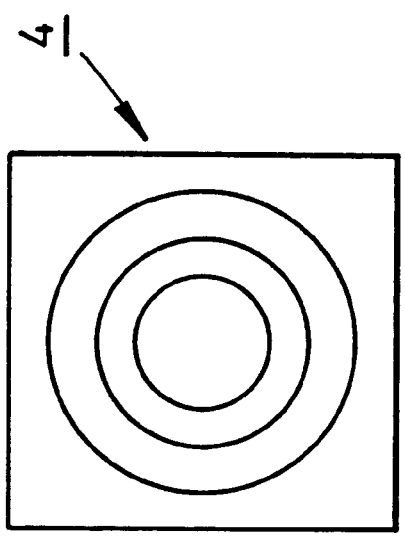
Figure 18C:
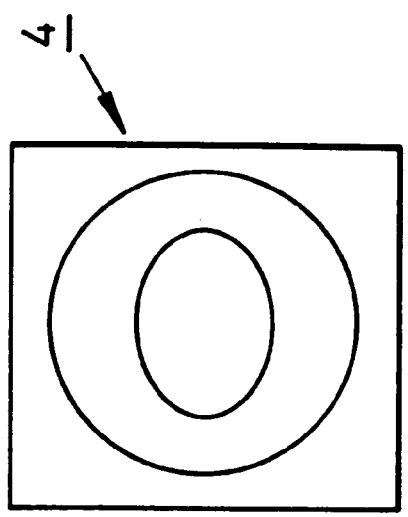

As an aperture pattern of the liquid crystal panel 4 to attenuate the light amount, in addition to the circular pattern 405 shown in FIG. 16, the aperture patterns shown in, for example, FIGS. 18A, 18B, and 18C can be used. The control method of reducing the spot diameter by dropping the light amount of the center portion can be also similarly applied to the optical pickup using the electrochromic panel 10 shown in FIG. 10.

Although the embodiments of the invention have been described above, the invention is not limited to the embodiments but many modifications and variations are possible within the spirit and scope of the invention.

According to the first aspect of the invention, the diaphragm means which can electrically vary the aperture pattern is arranged between the objective lens and the polarization beam splitter and the aperture pattern is switched in accordance with the optical disc which is used, so that it can be used for both the DVD and the CD only by being under complete electrical control and an optical pickup which can be easily treated can be provided. The construction is simple since there is no mechanical motion portion and the reduction in size can be realized. Further, since the interference or diffraction of the light as in a hologram lens is not used, the use efficiency of the light is also excellent.

According to the second aspect of the invention, the low cost liquid crystal panel which is also technically stable is used as an electric diaphgram means, and in addition to the effects of the first aspect, the optical pickup can be further made smaller and provided at a smaller cost.

According to the third aspect of the invention, in the optical pickup using the liquid crystal panel, the plurality of aperture patterns are formed along the radial direction of the disc and the applied voltage is controlled so that the aperture pattern portion in which the optical axis of the objective lens coincides with the center of the aperture functions as a ¼ wavelength plate. Even if the objective lens is moved to the radial direction of the disc by the tracking servo, the optical axis of the objective lens and the aperture center of the aperture pattern of the liquid crystal panel can be always made to coincide, so that the deterioration in the performance of the optical pickup can be prevented.

According to another aspect of the invention, the voltage which is applied to the liquid crystal panel is variably controlled to the optimum value on the basis of the applied voltage—light reception amount characteristics of the liquid crystal panel, so that even if there is a difference about the ambient temperature change or the cell thickness, the liquid crystal panel can be allowed to accurately function as a ¼ wavelength plate.

According to a further aspect of the invention, since the amount of the transmission light in the center portion of the liquid crystal panel is attenuated, the rim intensity of the light which enters the objective lens can be equivalently raised, so that the spot diameter on the disc can be further converged. The data which has been recorded in the read only DVD-ROM or the like at a high density can be, therefore, also certainly read out.

According to a further aspect of the invention, since the electrochromic panel having a large absorption coefficient is used as an electrical diaphragm means, in addition to the effects of the first aspect of the invention, an optical pickup which can be switched more certainly can be provided.

According to a further aspect of the invention, in the optical pickup using the electrochromic panel, the plurality of aperture patterns are formed along the radial direction of the disc and the applied voltage is controlled so that the aperture pattern portion in which the optical axis of the objective lens and the aperture center coincide functions as a ¼ wavelength plate. Even if the objective lens is moved in the radial direction of the disc by the tracking servo, therefore, the optical axis of the objective lens and the aperture center of the aperture pattern of the liquid crystal panel can be made always to coincide, so that the deterioration in the performance of the optical pickup can be prevented.

According to a further aspect of the invention, since the transmission light amount in the center portion of the electrochromic panel is attenuated, the rim intensity of the light entering the objective lens can be equivalently raised, so that the spot diameter on the disc can be further converged. The data which has been recorded in the read only DVD-ROX or the like at a high density can be certainly read out.

According to the invention disclosed in claim 9, since the circular pattern is used as an aperture pattern, pattern designing is simplified.

What is claimed is:

1. An optical pickup comprising:
   a laser light source;
   an objective lens;
   a liquid crystal panel arranged in an optical path between said laser light source and said objective lens, said liquid crystal panel having an electrode divided into sections forming at least an aperture pattern defining at least a size of a light beam passing said liquid crystal panel; and
   a driver for driving said liquid crystal panel in different ways depending on a type of a recording medium to be reproduced, wherein said sections of said electrode include an oval central section and at least an annular section positioned outside said central section and a peripheral section, and form a plurality of concentric aperture patterns.

2. An optical pickup comprising:
   a laser light source;
   an objective lens;
   a liquid crystal panel arranged in an optical path between said laser light source and said objective lens, said liquid crystal panel having an electrode divided into sections forming at least an aperture pattern defining at least a size of a light beam passing said liquid crystal panel; and
   a driver for driving said liquid crystal panel in different ways depending on a type of a recording medium to be reproduced, wherein said sections of said electrode include a central section and pairs of sections positioned on both sides of said central section and a peripheral section, and form a plurality of general circular aperture patterns linearly shifted from each other in an overlapped manner.

3. An optical pickup as claimed in claim 2, wherein said driver applies a same voltage to all of said sections of said electrode when a high density recording medium is to be reproduced, and differently drives said sections of said electrode except sections located inside said one of said aperture patterns when a low density recording medium is to be reproduced.

4. An optical pickup as claimed in claim 3 wherein said driver applies, when a low density recording medium is to be reproduced, a first voltage to said sections of said electrode located inside said one of said aperture patterns and a second voltage different from said first voltage to sections of said electrode located outside said one of said aperture patterns.

5. An optical pickup as claimed in claim 4, wherein said driver is operative to select one of said aperture patterns according to an amount of shift of said objective lens and to supply said first voltage to said sections of said electrode located inside said one of said aperture patterns.

* * * * *